(12) United States Patent
Hirano et al.

(10) Patent No.: US 7,787,730 B2
(45) Date of Patent: Aug. 31, 2010

(54) OPTICAL FIBER AND BROADBAND LIGHT SOURCE

(75) Inventors: Masaaki Hirano, Yokohama (JP);
Tetsuya Nakanishi, Yokohama (JP);
Toshiaki Okuno, Yokohama (JP)

(73) Assignee: Sumitomo Electric Industries, Ltd., Osaka-Shi (JP)

( * ) Notice: Subject to any disclaimer, the term of this patent is extended or adjusted under 35 U.S.C. 154(b) by 210 days.

(21) Appl. No.: 11/922,783

(22) PCT Filed: Mar. 12, 2007

(86) PCT No.: PCT/JP2007/054835

§ 371 (c)(1),
(2), (4) Date: Dec. 21, 2007

(87) PCT Pub. No.: WO2007/105692

PCT Pub. Date: Sep. 20, 2007

(65) Prior Publication Data

US 2009/0129409 A1  May 21, 2009

(30) Foreign Application Priority Data

Mar. 15, 2006  (JP) ............................. 2006-071137

(51) Int. Cl.
*G02B 6/02* (2006.01)
(52) U.S. Cl. ..................................... 385/123
(58) Field of Classification Search .................. 385/123
See application file for complete search history.

(56) References Cited

U.S. PATENT DOCUMENTS 4,835,778 A * 5/1989 Kafka et al. ................... 372/6
2001/0031119 A1* 10/2001 Kato et al. ................... 385/123

(Continued)

FOREIGN PATENT DOCUMENTS

EP  1 209 497 A2  5/2002

(Continued)

OTHER PUBLICATIONS

Westbrook P. S., 'Improved Supercontinuum Generation through UV Processing of Highly Nonlinear Fibers,' IEEE Journal of Lightwave Technology, vol. 23, No. 1, Jan. 2005, p. 13-18.

(Continued)

*Primary Examiner*—Uyen-Chau N Le
*Assistant Examiner*—Hoang Tran
(74) *Attorney, Agent, or Firm*—Venable LLP; Michael A. Sartori; Steven J. Schwarz

(57) ABSTRACT

An optical fiber and a broadband light source that can generate SC light having a broader bandwidth. A broadband light source 1 is equipped with a seed light source 11 and an optical fiber 12. The seed light source 11 outputs light having a central wavelength in the wavelength range of 1500 nm to 1650 nm. The optical fiber 12 outputs supercontinuum light a result of input of the light output from the seed light source. The optical fiber 12, which has a zero dispersion wavelength in the wavelength range of 1300 nm to 1500 nm and an effective area of 12 μm$^2$ or less at the central wavelength, outputs supercontinuum light having a wavelength bandwidth expanded to 1000 nm or more.

17 Claims, 17 Drawing Sheets

U.S. PATENT DOCUMENTS

| | | | |
|---|---|---|---|
| 2002/0005969 A1* | 1/2002 | Ranka et al. | 359/161 |
| 2002/0061176 A1* | 5/2002 | Libori et al. | 385/125 |
| 2007/0053641 A1* | 3/2007 | Hirano et al. | 385/124 |

FOREIGN PATENT DOCUMENTS

| | | | |
|---|---|---|---|
| JP | 10-90737 A | | 4/1998 |
| JP | 10-090737 | * | 10/1998 |
| JP | 2002-207136 A | | 7/2002 |
| JP | 2004-287382 A | | 10/2004 |
| JP | 2005-234581 A | | 9/2005 |
| JP | 2005-331818 A | | 12/2005 |
| JP | 2007-17907 A | | 1/2007 |
| WO | WO 99/10770 A1 | | 3/1999 |
| WO | WO 01/02904 A1 | | 1/2001 |

OTHER PUBLICATIONS

Okuno, Toshiaki et al., "Hikari Fiber no Hisenkeisei o Riyo shita Kotaiiki Kinsekigai Pulse Laser Kogen", Dai 21 Kai Kinsekigai Foramu Koen Yoshi, Nov. 9, 2005, P-33, p. 173.

Hirano, Masaaki et al., "Silica-base Kohisenkei Hikari Fiber to sono Oyo Gijutsu", Denki Joho Tsushin Gakkai Gijutsu Kenkyu Hokoku, vol. 105, No. 592, Jan. 25, 2006, LQE2005-140, pp. 39 to 42.

Schibli T.R. et al., "Frequency metrology with a turnkey all-fiber system", Optical Letters, vol. 29, No. 21, Nov. 1, 2004, pp. 2467-2469.

Joergensen, C.G. et al., "Dispersion Flattened Highly Non-Linear Fiber", ECOC-IOOC 2003 Proceedings—vol. 3, pp. 556-557.

Unterhuber A. et al., "In vivo retinal optical coherence tomography at 1040 nm—enhanced penetration into the choroid", Optics Express, vol. 13, No. 9, May 2, 2005, pp. 3252-3258.

Barnett B.C., et al., High-power erbium-doped fiber laser mode locked by a semiconductor saturable absorber, Optics Letters, Mar. 1, 1995, pp. 471-473, vol. 20, No. 5, Optical Society of America.

Ursula Keller, et al., Semiconductor Saturable Absorber Mirrors (SESAM's) for Femtosecond to Nanosecond Pulse Generation in Solid-State Lasers, IEEE Journal of Selected Topics in Quantum Electronics, Sep. 1, 1996, pp. 435-453, vol. 2, No. 3, IEEE Services Center, Piscataway, NJ., U.S.

* cited by examiner

OPTICAL FIBER AND BROADBAND LIGHT SOURCE

TECHNICAL FIELD

The present invention relates to an optical fiber having high nonlinearity, and also to a broadband light source which generates broadband light using the nonlinear optical phenomenon in such optical fiber.

BACKGROUND ART

The supercontinuum light source (SC light source), which is a kind of broadband light source, has characteristics such as high output performance, broadband performance, spectral flatness, etc. Such a broadband light source is expected as an important light source to be applied to various fields: for example, application to optical measurement and near infrared spectroscopy. Of various compositions proposed as such a broadband light source, generally the broadband light source that can generate SC light in an optical fiber is widely used, since the composition is simple, and it is easy to elongate the interaction length and to control the spectrum.

On the other hand, main examples of light sources which are used as a seed light source for emitting seed light to be input into an optical fiber in order to generate SC light are a short pulse light source on the order of picosecond or femtosecond, a pulsed light source on the order of nanosecond, a continuous wave light source (CW light source), etc. A typical example of the short pulse light source is a titanium sapphire laser beam source, which is widely used in general. An example of a light source to oscillate in the vicinity of the 1550 nm wavelength, which is an important wavelength band particularly in optical communications, is a fiber laser beam source including an erbium-doped optical fiber as an optical amplification medium. Such a fiber laser beam source is also under active development as a light source for generating short pulse light.

A number of reports regarding the generation of SC light have been published in the past. Recently, active investigations are conducted using a holey fiber such as a photonic crystal fiber which has a zero dispersion wavelength in the vicinity of the oscillation wavelength of a titanium sapphire laser beam source. The SC light generated with a holey fiber can achieve a very broad band of about 400 nm to 1700 nm. However, a number of problems are involved: for example, the spectrum of the SC light is unstable because of a large polarization mode dispersion (PMD) of the holey fiber, and the pulsed light source system itself is large-sized, resulting in difficulty of handling, etc.

On the other hand, the short pulse light source of 1550 nm wavelength band, a typical example of which is an Er-doped fiber laser beam source, has merits in terms of stability, small size, and portability, and is advantageous in that high output can easily be obtained if it is used in combination with an optical amplifier. According to certain reports, by combining this light source with a highly nonlinear optical fiber, SC light of broad bandwidth having a wavelength band of 1140 nm to 2400 nm is generated. (Refer to non-patent documents 1 and 2).

However, in the past, it has been difficult to simultaneously expand the spectrum of the SC light to 2200 nm or more on the longer wavelength side and to 1100 nm or less on the shorter wavelength side, and in fact there is little report on such an example. A technique intended to further expand the broad bandwidth of SC light is disclosed in a non-patent document 3. In the technique disclosed in this non-patent document 3, it is attempted that the expansion of the SC light spectrum be achieved by irradiating ultraviolet light to the optical fiber so as to shift the zero dispersion wavelength of an optical fiber to the shorter wavelength side. However, there are problems yet to be solved in the technique: large-scale irradiation equipment is necessary to irradiate ultraviolet light to the optical fiber; the shifting is irreversible and accordingly the adjusting of fiber characteristics is difficult, etc. Thus, it has been difficult in the past to achieve a light source that can output SC light having a broad bandwidth covering a range of 1.0 µm to 2.3 µm (further, a wavelength range of 0.8 µm to 2.5 µm), although it would be useful if such a light source is available.

Non-patent document 1: T. R. Schibli, et al.: Opt. Lett. Vol. 29 (2004) 2467.

Non-patent document 2: Okuno, et al.: The brief collection of lectures at 21st Near-infrared Forum, P-33, Page 173 (2005).

Non-patent document 3: P. S. Westbrook, et al.: J. of Lightwave Techn. Vol. 23 (2005) 13.

DISCLOSURE OF INVENTION

Problems to be solved by the invention

An object of the present invention is to provide an optical fiber and a broadband light source that can generate SC light having a broader bandwidth.

Means for Solving the Problems to be Solved

To achieve such object, an optical fiber is provided which has a zero dispersion wavelength in the wavelength range of 1300 nm to 1500 nm, the effective area of the optical fiber being equal to or less than 12 $\mu m^2$ and the chromatic dispersion being 0 or more and 10 ps/nm/km or less at a wavelength of 1550 nm, and the chromatic dispersion being 0 ps/nm/km or more in the wavelength range of 1500 nm to 2000 nm.

Furthermore, an optical fiber is provided which can output supercontinuum light having a wavelength bandwidth expanded to 1000 nm or more by input of light having a central wavelength within a wavelength range of 1500 nm to 1650 nm, the optical fiber having a zero dispersion wavelength in the wavelength range of 1300 nm to 1500 nm, and at the central wavelength the effective area being equal to or less than 12 $\mu m^2$ and the chromatic dispersion being 0 or more and 10 ps/nm/km or less.

Another aspect of the present invention is to provide a broadband light source equipped with a seed light source and an optical fiber, the seed light source being capable of outputting light having a central wavelength in the wavelength range of 1500 nm to 1650 nm, and the optical fiber being capable of outputting supercontinuum light as a result of input of the light output from the seed light source. The optical fiber included in this broadband light source has a zero dispersion wavelength in the wavelength range of 1300 nm to 1500 nm and an effective area of 12 $\mu m^2$ or less at the central wavelength, and outputs the supercontinuum light having a wavelength bandwidth expanded to 1000 nm or more.

ADVANTAGEOUS EFFECT OF THE INVENTION

According to the present invention, it is possible to generate SC light having a broader bandwidth.

DESCRIPTION OF REFERENCED NUMERALS

Figure 1:
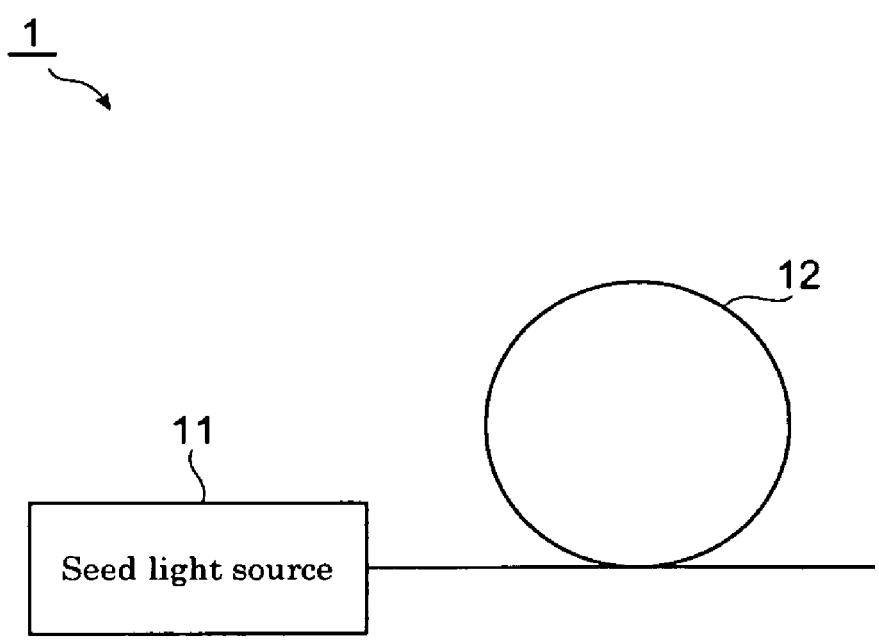
FIG. 1 A schematic diagram of a broadband light source according to an embodiment A of the present invention.

1 ... broadband light source, 2 ... wavelength converter, 11 ... seed light source, 12 ... optical fiber, 21 ... pump light source, 22 ... optical fiber, 23 ... optical amplifier, 24 ... bandpass filter, 25 ... optical coupler, 26 ... power monitor

BEST MODE FOR CARRYING OUT THE INVENTION

Hereinafter, preferred embodiments of the present invention will be described in reference to the accompanying drawings. The drawings are provided for the purpose of explaining the embodiments and are not intended to limit the scope of the invention. In the drawings, an identical mark represents the same element so that the repetition of explanation may be omitted. The dimensional ratios in the drawings do not always exact.

FIG. 1 is a schematic diagram of an embodiment (hereinafter, called the "embodiment A") of the broadband light source according to the present invention. A broadband light source 1 is equipped with a seed light source 11 and an optical fiber 12. The seed light source 11, which is provided for the purpose of outputting seed light to be input to the optical fiber 12, outputs light having a central wavelength in the wavelength range of 1500 nm to 1650 nm as the seed light.

The seed light source 11 is preferably a pulsed light source. In such case, the peak power of the seed light can be increased, and also it is possible to generate a relatively broad bandwidth with a low average power. Particularly, the slower the repeat frequency (equal to or less than 100 MHz), the better. Preferably, the seed light source 11 is an Er-doped fiber laser light source, and in this case, the coupling to a downstream fiber for output is easy and the construction can be made easily at a comparatively low cost. Also, preferably, the seed light source 11 is a pulsed light source having an amplification medium incorporating an Er-doped glass and a semiconductor saturable absorber mirror in the cavity, and in this case, it is possible to achieve a low noise and compact broadband light source having a stabilized oscillation cavity.

The optical fiber 12, which is an optical fiber of high nonlinearity, receives light output from the seed light source 11 and outputs supercontinuum light (SC light). The optical fiber 12 has a zero dispersion wavelength in the wavelength range of 1300 nm to 1500 nm, and the effective area thereof is equal to or less than 12 $\mu m^2$ at the wavelength of 1550 nm, whereas the chromatic dispersion is 0 or more and 10 ps/nm/km or less, and in wavelength range of 1500 nm to 2000 nm the chromatic dispersion is 0 ps/nm/km or more. The optical fiber 12 receives, at one end, seed light output from the seed light source 11, allows the seed light to pass therethrough so as to generate SC light expanded due to nonlinear optical phenomenon to 1000 nm or more in wavelength bandwidth, and outputs the SC light from the other end.

The length of a highly nonlinear fiber to be used is generally in a range of several centimeters to several hundreds meters. It is known that in the case of such a short length as several tens of centimeters or less, the noise which the seed light source has is not amplified, enabling a low-noise SC light source, while the ripple of the SC spectrum increases. On the other hand, in the case of a fiber having such a long length as several meters or more, the noise increases but the ripple decreases, and it is possible to obtain a flat SC spectrum with respect to the wavelength. The length of a highly nonlinear fiber to be used can be determined so as to suit the use of the SC light source.

Generally, an optical fiber is drawn with a spool having a winding length of several kilometers and is inspected. The highly nonlinear fiber to be used for generation of SC light is very short as compared with such a winding length of the spool. Therefore, if the longitudinal characteristics, particularly the dispersion characteristics of the highly nonlinear fiber are varied, the properties of the fabricated SC light source will change. Therefore, the transmission characteristics in the longitudinal direction must be uniform, and desirably, over the fiber length of 1 km, the fluctuation of the dispersion value at the wavelength of 1550 nm is preferably not beyond the range from −0.5 ps/nm/km to +0.5 ps/nm/km. In the case of such fiber, a stable SC spectrum can be obtained regardless of where it is cut.

The following description is a concrete example of a broadband light source one. The seed light output from a seed light source 11 has a pulse center wavelength of 1550 nm, a pulse repeat frequency of 75 MHz, a power of 80 mW, and a pulse duration of 300 fs. The optical fiber 12 has a transmission loss pulse center wavelength of 1550 nm, a pulse repeat frequency of 75 MHz, a power of 80 mW, and a pulse duration of 300 fs is input.

TABLE I

|  | Transmission loss (dB/km) | Zero-dispersion wavelength (nm) | Dispersion (ps/km/nm) | Dispersion slope (ps/km/nm$^2$) | Cutoff wavelength (nm) | Aeff (μm$^2$) | MFD (μm) | γ/W/km | PMD ps/√km | Wavelength at 10 dB decrease (nm) |
|---|---|---|---|---|---|---|---|---|---|---|
| Fiber 1 | 1.2 | 1359 | 8.2 | 0.027 | 1430 | 9.9 | 3.5 | 25 | 0.04 | 840 |
| Fiber 2 | 1.8 | 1379 | 6.5 | 0.024 | 1410 | 9.7 | 3.5 | 25 | 0.15 | 890 |
| Fiber 3 | 1.0 | 1412 | 4.9 | 0.026 | 1340 | 9.4 | 3.5 | 26 | 0.05 | 900 |
| Fiber 4 | 1.4 | 1452 | 2.9 | 0.024 | 1300 | 9.2 | 3.5 | 27 | 0.03 | 960 |
| Fiber 5 | 1.2 | 1494 | 1.4 | 0.021 | 1270 | 9.1 | 3.4 | 27 | 0.10 | 995 |
| Fiber 6 | 0.95 | 1510 | 0.9 | 0.021 | 1410 | 9.8 | 3.6 | 24 | 0.08 | 1015 |
| Fiber 7 | 0.54 | 1524 | 0.8 | 0.036 | 1560 | 11.1 | 3.8 | 20 | 0.02 | 1010 |
| Fiber 8 | 0.95 | 1544 | 0.3 | 0.025 | 1460 | 9.5 | 3.6 | 27 | 0.04 | 1040 |
| Fiber 9 | 0.52 | 1570 | -0.6 | 0.032 | 1450 | 11.0 | 3.8 | 20 | 0.01 | 1060 | of 0.6 dB/km in 1550 nm, a dispersion slope of 0.03 ps/nm$^2$/km, an effective area of 12 μm$^2$, and a mode field diameter (MFD) of 4 μm, a cutoff wavelength of 1260 nm, a polarization mode dispersion (PMD) of 0.04 ps/km$^{1/2}$, and a length of 50 m.

Figure 2:
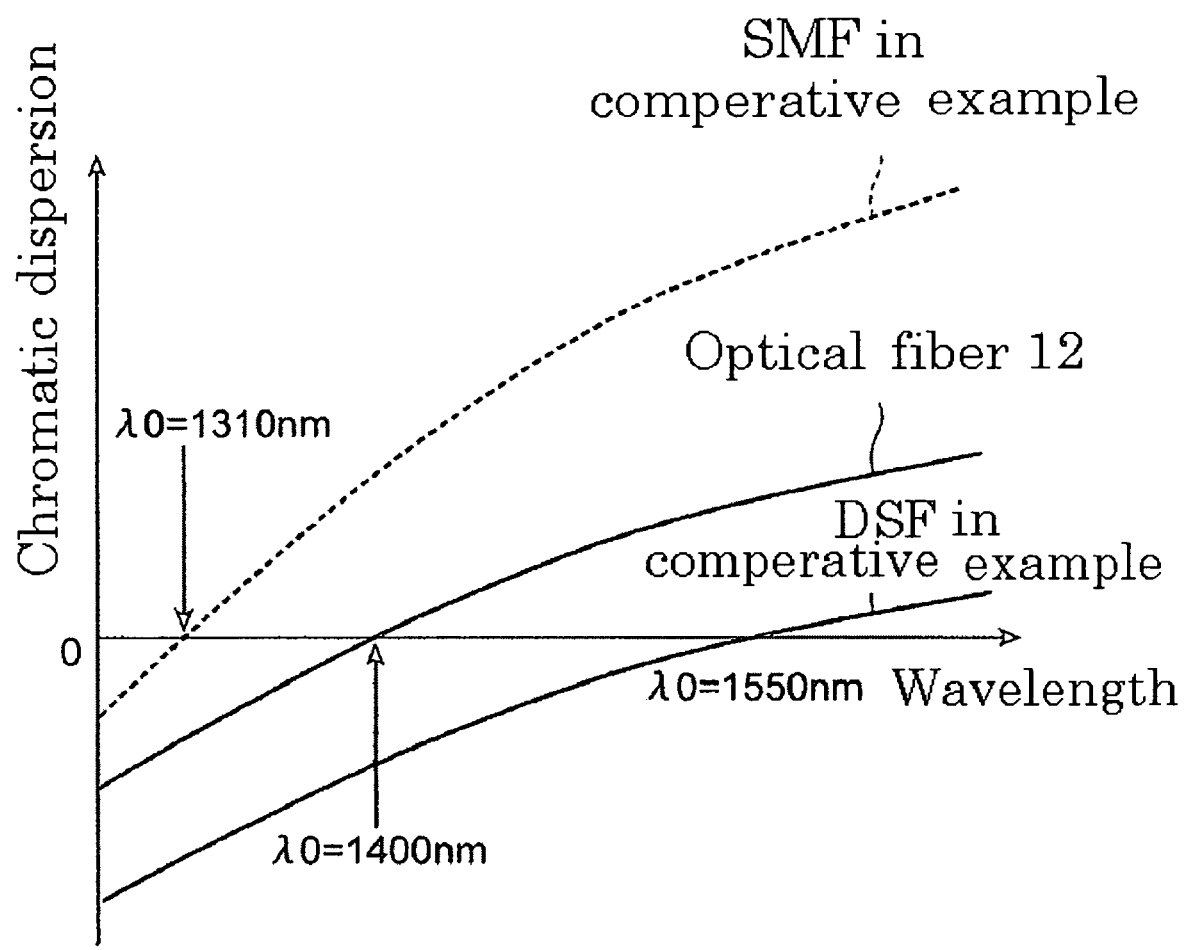
FIG. 2 A graph showing the dispersion characteristic of an optical fiber in the broadband light source of the embodiment A.

FIG. 2 is a graph showing the dispersion characteristic of the optical fiber 12. In FIG. 2, the respective dispersion characteristics of a single mode fiber (SMF) and a dispersion-shifted optical fiber (DSF) are also shown as comparative examples. The zero dispersion wavelength of SMF is around 1310 nm, and that of DSF is around 1550 nm, whereas the zero dispersion wavelength of the optical fiber 12 is within the wavelength range of 1300 nm to 1500 nm. Also, the optical fiber 12 has a chromatic dispersion of 0 ps/nm/km or more and 10 ps/nm/km or less at the wavelength of 1550 nm, and the chromatic dispersion is 0 ps/nm/km or more in the wavelength range of 1500 nm to 2000 nm.

Since the optical fiber 12 has such a small effective area as 12 μm$^2$ or less, the nonlinear coefficient γ is as large as 18/W/km (when measured by an XPM method), which tends to allow a nonlinear phenomenon to easily occur. Particularly, the effective area is more preferably 10 μm$^2$ or less: in this case, the nonlinear coefficient γ becomes 24/W/km or more. Also, the mode field diameter (MFD) is preferably equal to or less than 4.0 μm.

In the optical fiber 12, when the pulsed seed light output from the seed light source 11 is input thereinto, SC light is generated as a result of complicated nonlinear phenomena such as spectrum expansion due to self phase modulation (SPM), self-frequency-sifted soliton, and higher-order soliton fission. Making the chromatic dispersion of the optical fiber 12 at the central wavelength of the input pulsed light to be 0 to +10 ps/nm/km (equivalent to a zero dispersion wavelength of 1340 nm or more) enables restraining the waveform change of the seed pulse itself at the occurrence of spectrum expansion due to nonlinear phenomenon, and hence the stable generation of spectrum having a broader bandwidth is made possible. More preferably, the dispersion value at the wavelength of 1550 nm is 0 to +5 ps/nm/km (corresponding to zero dispersion wavelength of 1410 nm or more).

The characteristics of concrete examples of the optical fiber 12 and the comparative examples are shown in Table I. In Table I, the characteristics except for the zero dispersion wavelength and the cutoff wavelength are values at 1550 nm. In addition, Table I shows wavelengths on the shorter wavelength side at which the SC light spectrum decreases by 10 dB from the peak value at the time when the seed light having a Also, the optical fiber 12 has anomalous dispersion in the wavelength range of 1500 nm to 2000 nm. Therefore, the generation of the soliton phenomenon becomes possible, and the spectrum expands to the longer wavelength side, and also the spectrum as the idler light tends to expand to the shorter wavelength side. Particularly, it is preferable that the optical fiber 12 have anomalous dispersion at a wavelength of 1500 to 2200 nm.

Figure 3:
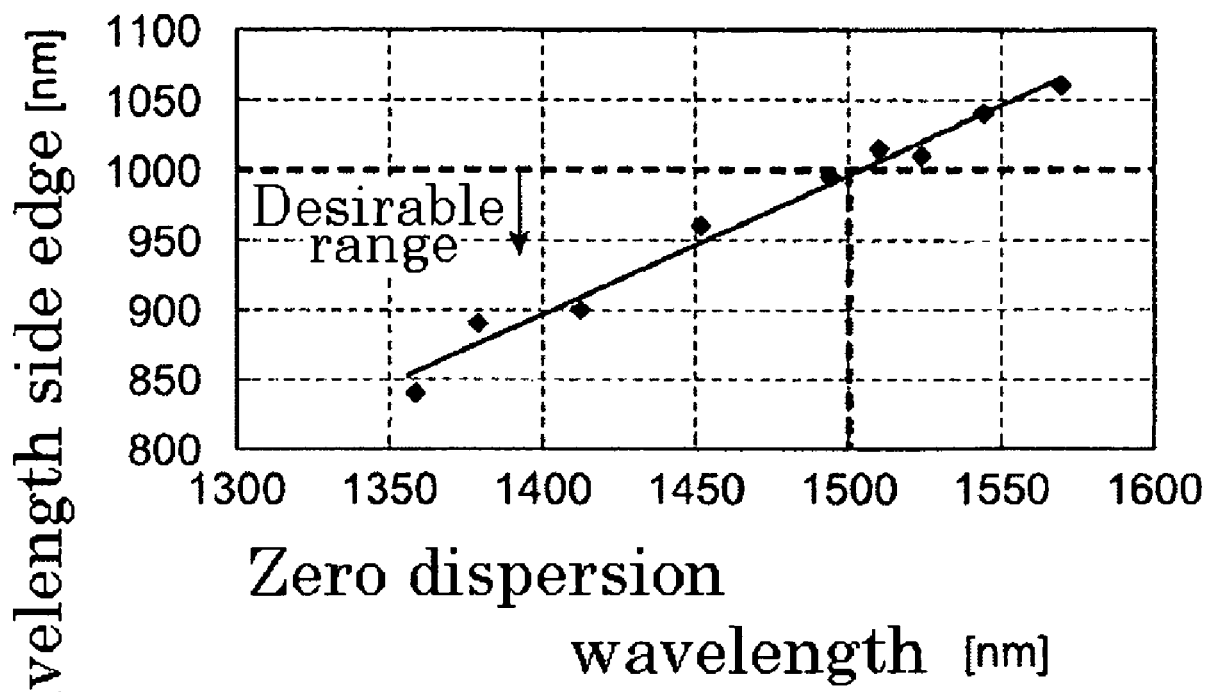
FIG. 3 A graph showing the relationship between the zero dispersion wavelength and the edge on the shorter wavelength side in a SC spectrum.

For example, a two-meter length of an optical fiber having a dispersion slope of about +0.02 to +0.04 ps/nm$^2$/km and an effective area of about 9 to 11 μm$^2$ is used as the optical fiber 12. The seed light that is output from the seed light source 11 so as to be input into the optical fiber 12 is the pulsed light having a central wavelength of 1550 nm, a repeat frequency of 50 MHz, and a pulse duration of 90 fs, the power incident to the optical fiber 12 being 300 mW. FIG. 3 shows the relationship between a zero dispersion wavelength and a wavelength on the shorter wavelength side (an edge on the shorter wavelength side) at which the spectral density of SC light decreases by 10 dB from the peak value when the seed light is incident on optical fiber 12.

Also, in all examples, the wavelengths on the longer wavelength side where the spectral density of SC light decreases by 10 dB from the peak value were equal to or more than 2200 nm. Therefore, it is desirable that the zero dispersion wavelength be equal to or less than 1500 nm, because thereby it is made possible for the generated broadband light to have the edge of the spectrum on the shorter wavelength side at a wavelength of 1000 nm or less. The zero dispersion wavelength is limited to 1300 nm or more because of the material dispersion curve of silica glass.

Figure 4:
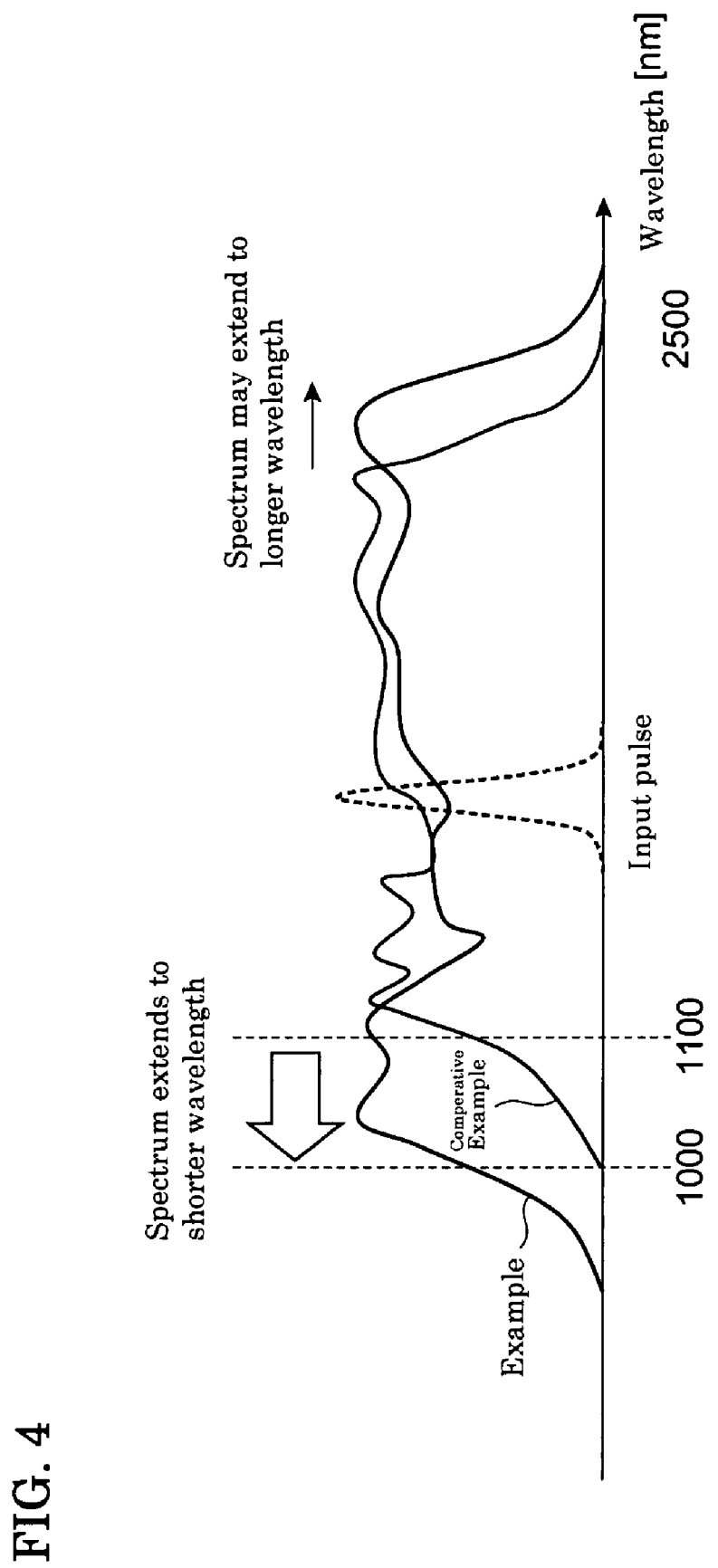
FIG. 4 A schematic diagram showing the spectrum of SC light output from the broadband light source of the embodiment A.

FIG. 4 is a schematic diagram showing the spectrum of the SC light output from the broadband light source 1. As shown in FIG. 4, the spectrum of the SC light output from the broadband light source 1 is expanded to the longer wavelength side, as well as the shorter wavelength side, as compared with the SC light spectrum of the comparative examples.

Table II shows the characteristics of other concrete examples (fibers 21 to 23) of the optical fiber 12. In addition, Table II shows the wavelengths on the shorter wavelength side where the SC light spectrum decreases by 10 dB from the peak value when the seed light having a pulse center wavelength of 1550 nm, a pulse repeat frequency of 50 MHz, a power of 100 mW, and a pulse duration of 200 fs is input to a 10 m length of an optical fiber.

TABLE II

|  | Transmission loss (dB/km) | Zero-dispersion wavelength (nm) | Dispersion (ps/km/nm) | Dispersion slope (ps/km/nm²) | Cutoff wavelength (nm) | Aeff (µm²) | MFD (µm) | γ/W/km | PMD ps/√km | Wavelength at 10 dB decrease (nm) |
|---|---|---|---|---|---|---|---|---|---|---|
| Fiber 21 | 0.9 | 1421 | 6.7 | 0.026 | 1600 | 10.1 | 3.6 | 22 | 0.05 | 930 |
| Fiber 22 | 0.6 | 1452 | 3.9 | 0.032 | 1560 | 10.5 | 3.7 | 20 | 0.03 | 990 |
| Fiber 23 | 1.5 | 1535 | 0.33 | 0.02 | 1420 | 9.2 | 3.5 | 25 | 0.2 | 1080 |

Figure 5:
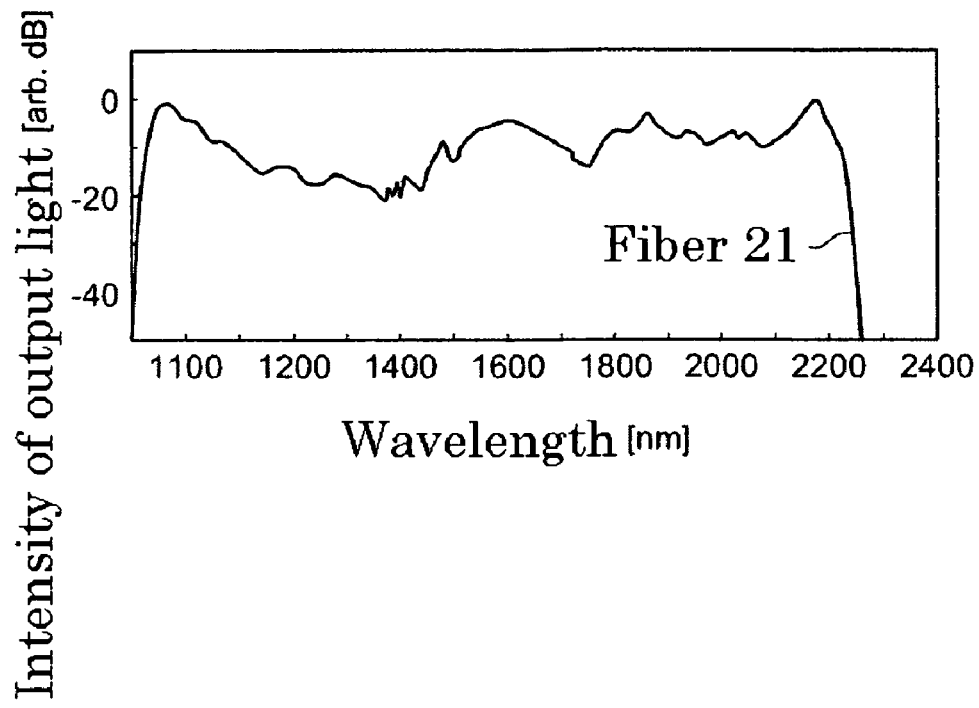
FIG. 5 A graph showing the spectrum of SC light output from a fiber 21.
Figure 6:
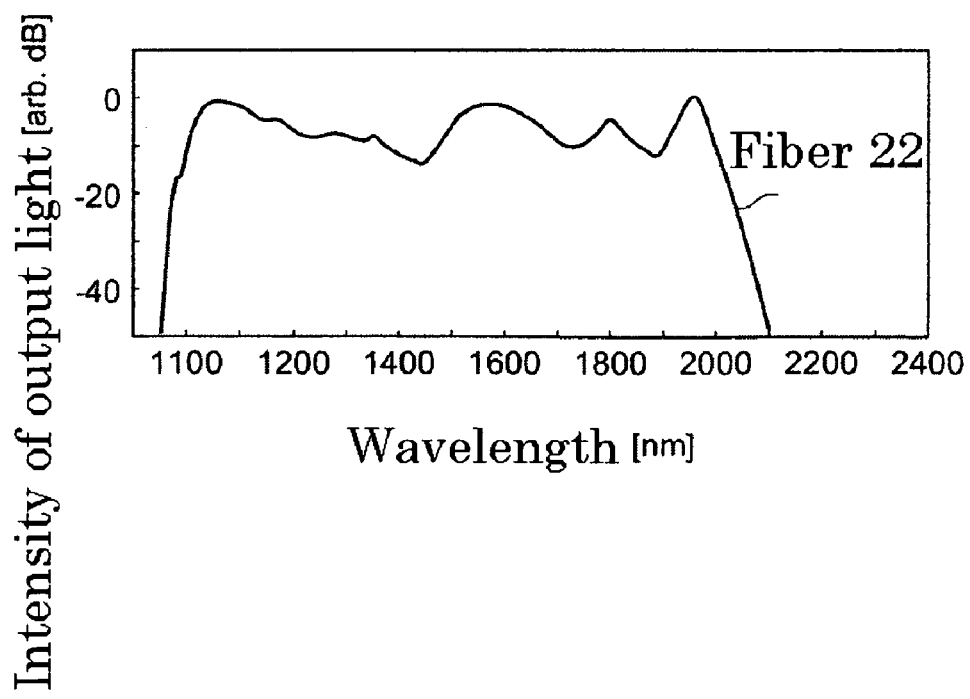
FIG. 6 A graph showing the spectrum of SC light output from a fiber 22.
Figure 7:
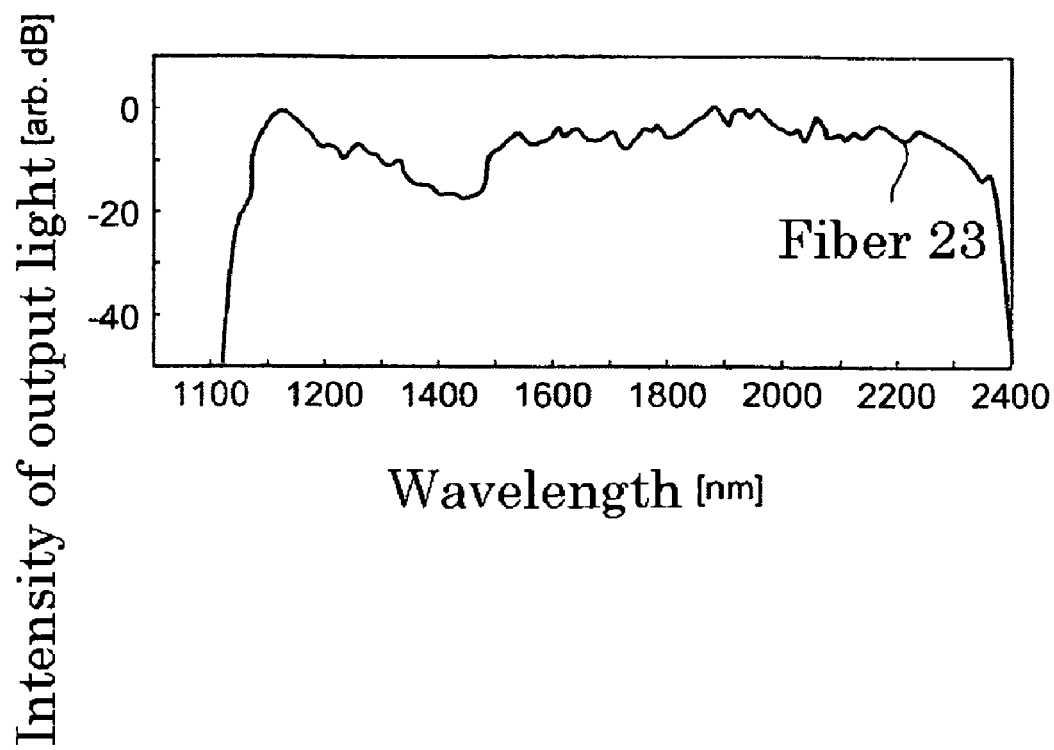
FIG. 7 A graph showing the spectrum of SC light output from a fiber 23.

FIGS. 5, 6, and 7 are graphs showing the spectrum of the SC light output from fibers 22, 21, and 23, respectively. Where the zero dispersion wavelength is 1500 nm or less as in the cases of the fibers 21 and 22, the shorter wavelength side of the SC light expands to the extent of 1000 nm or less, which is preferable. On the other hand, in the case of the fiber 23 in which the zero dispersion wavelength is 1535 nm, the shorter wavelength side of the SC light does not expand to the extent of 1000 nm or less.

Figure 8:
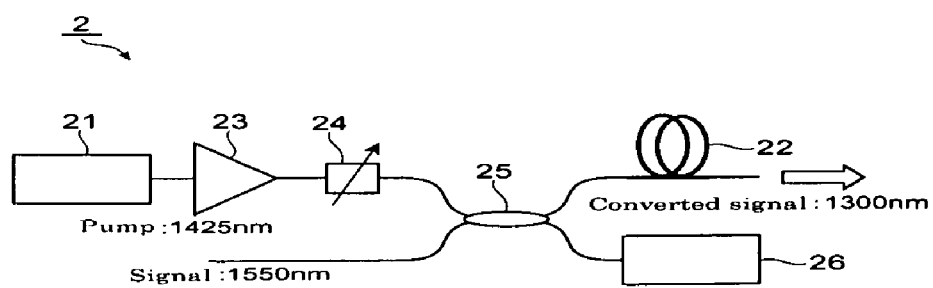
FIG. 8 A schematic diagram of a wavelength converter 2 which uses an optical fiber according to the embodiment B of the present invention.
Figure 9:
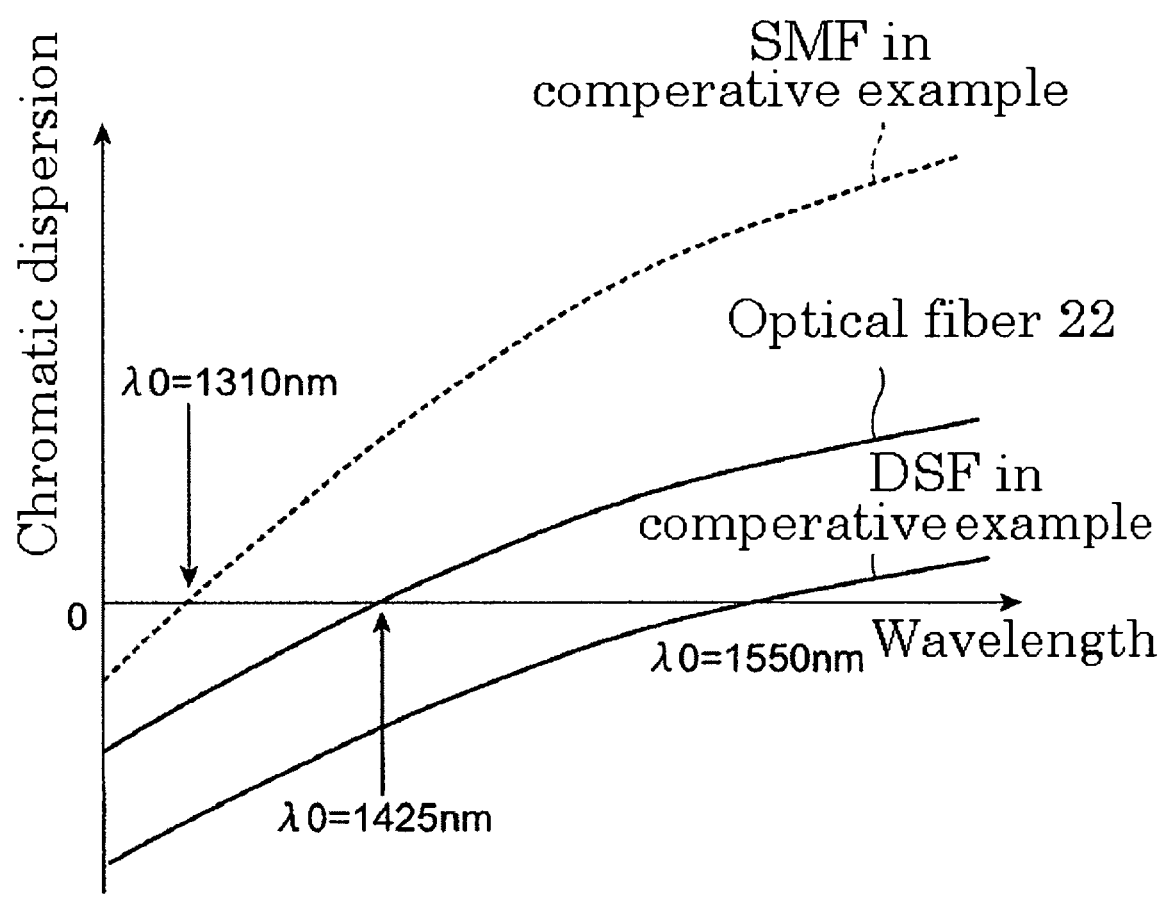
FIG. 9 A graph showing the dispersion characteristic of the optical fiber of the embodiment B.
Figure 10:
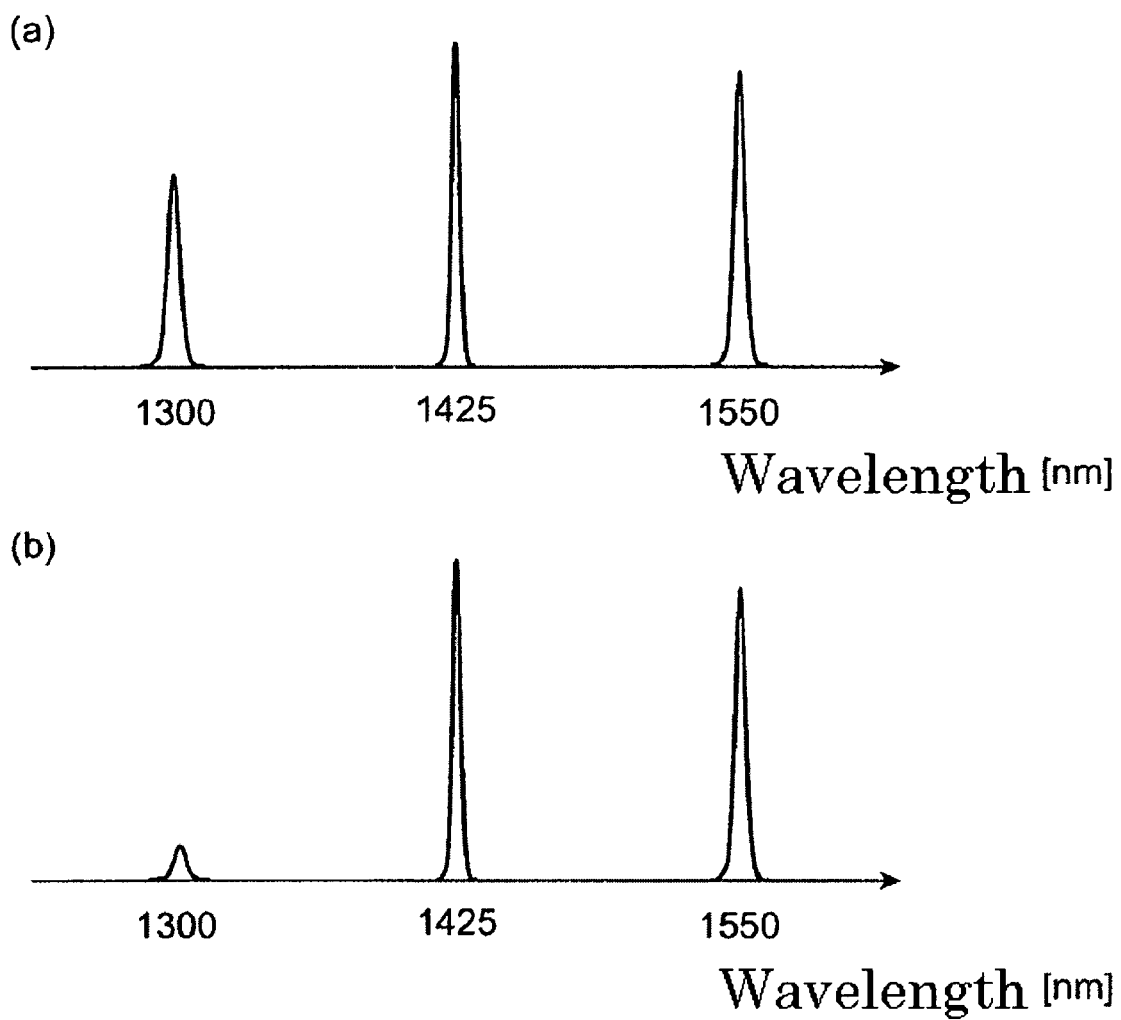
FIG. 10 (a) is a graph showing a wavelength change in the wavelength converter which uses an optical fiber of the embodiment B; and (b) is a graph showing a wavelength change in a Comparative Example.

When the zero dispersion wavelength of the optical fiber is equal to or less than 1425 nm, it is possible not only to generate short wavelength components in the broad bandwidth light but also to convert signal light having C-band about 1550 nm in wavelength into a wavelength of about 1300 nm by inputting pump light in the vicinity of the zero dispersion wavelength. FIG. 8 is a schematic diagram of a wavelength converter 2 which uses the embodiment (hereinafter, "embodiment B") of the optical fiber according to the present invention. The wavelength converter 2 shown in FIG. 8 is equipped with a pump light source 21, an optical fiber 22, an optical amplifier 23, a bandpass filter 24, an optical coupler 25 and a power monitor 26. FIG. 9 is a graph showing the dispersion characteristic of the optical fiber 22. In FIG. 10, the part (a) is a graph showing a wavelength conversion in the wavelength converter 2 and the part (b) is a graph showing the wavelength change in the comparative examples.

Hereinafter, the concrete example of the optical fiber 22 will be described as follows. The optical fiber 22 has a transmission loss of 1.2 dB/km, a dispersion slope of 0.025 ps/nm²/km, 64 of $0.9 \times 10^{-56}$ s⁴/m, an effective area of 9.3 µm², a mode field diameter (MFD) of 3.4 µm, a cutoff wavelength of 1450 nm, a polarization mode dispersion (PMD) of 0.03 ps/km$^{1/2}$, and a length of 100 m.

The pump light output from the pump light source 21 has a wavelength in the vicinity of the zero dispersion wavelength of the optical fiber 22. The pump light is optically amplified by the optical amplifier 23, passes through the bandpass filter 24, and is multiplexed with signal light having a wavelength in the vicinity of 1550 nm in the optical coupler 25, and is input into the optical fiber 22. Thus, in the optical fiber 22, signal light having a wavelength in the vicinity of 1300 nm is generated. In this manner, it is possible to perform a switchover between a forward signal and a backward signal without a transmitter-receiver which is generally placed in an exchange station in optical communications, for example, and also to change a wavelength-multiplexing signal of C-band to a wavelength-multiplexing signal of 1.3 µm band.

The optical fiber according to the present invention may have a cutoff wavelength of 1650 nm or less and a dispersion slope having an absolute value of 0.04 ps/nm²/km or less at a wavelength of 1550 nm. Since the cutoff wavelength is 1650 nm or less, the incident light travels through the optical fiber in a single mode, and therefore the influence of mode fluctuation at the time of SC light generation decreases. Particularly, it is preferable that the cutoff wavelength be equal to or less than 1450 nm, because in such case it is possible to reduce the influence of the mode fluctuation at the time of generation of components on the shorter wavelength side of the SC light and also to stabilize the output broadband spectrum, which is more preferable. The wavelength dependence of the chromatic dispersion value can be decreased because the absolute value of the dispersion slope is small, and accordingly the wavelength range with anomalous dispersion can be more expanded.

There is a certain preferable range with respect to the fourth-order dispersion value=dS/dλ, which is dependent on the wavelength (λ) of the dispersion slope (S). For example, in the case where the dispersion value is +4 ps/nm/km and the dispersion slope is +0.03 ps/nm²/km at the wavelength of 1550 nm, the relations are examined with respect to the fourth-order dispersion value dS/dλ, the zero dispersion wavelength falling at a wavelength of 1550 nm or more, and the maximum values of the chromatic dispersion in the wavelength range of 1500 nm to 2000 nm. Table III shows the results of the investigation.

TABLE III

| dS/dλ (ps/nm³/km) | Zero dispersion wavelength falling at wavelength of 1550 nm or more (nm) | Maximum chromatic dispersion value in wavelength range of 1500 nm to 2000 nm (ps/nm/km) |
|---|---|---|
| −0.00020 | 1940 | 6.1 |
| −0.00018 | 1980 | 6.4 |
| −0.00017 | 2000 | 6.5 |
| −0.00016 | 2020 | 6.7 |
| −0.00014 | 2080 | 7.1 |
| −0.00010 | >2200 | 8.4 |
| −0.00005 | >2200 | 12.3 |
| −0.00003 | >2200 | 14.4 |
| −0.00002 | >2200 | 15.4 |

It is understood that in order to obtain a chromatic dispersion of 0 ps/nm/km or more at a wavelength of 1500 to 2000 nm, the zero dispersion wavelength, if it exists on the longer wavelength side, must be longer than 2000 nm, and for that purpose, dS/dλ must be −0.00017 ps/nm³/km or more. On the other hand, in order to obtain a chromatic dispersion of 15 ps/nm/km or less at a wavelength of 1500 to 2000 nm, dS/dλ must be −0.00003 ps/nm³/km or less. Therefore, it is preferable that dS/dλ be −0.00017 ps/nm³/km or more and −0.00003 ps/nm³/km or less at the wavelength of 1550 nm. The suitable range of dS/dλ changes depending on the dispersion value and the dispersion slope at the 1550 nm wavelength.

The optical fiber of the present invention may have a chromatic dispersion of 0 ps/nm/km or more and 15 ps/nm/km or less in the wavelength range of 1500 nm to 2000 nm. Preferably, the chromatic dispersion is equal to or more than 0 ps/nm/km and 15 ps/nm/km or less in the wavelength range 1500 nm to 2200 nm, and more preferably 10 ps/nm/km or less, most preferably 5 ps/nm/km. The SC light can be made to efficiently expand in a wide wavelength range by not enlarging the absolute value of the chromatic dispersion.

Figure 11:
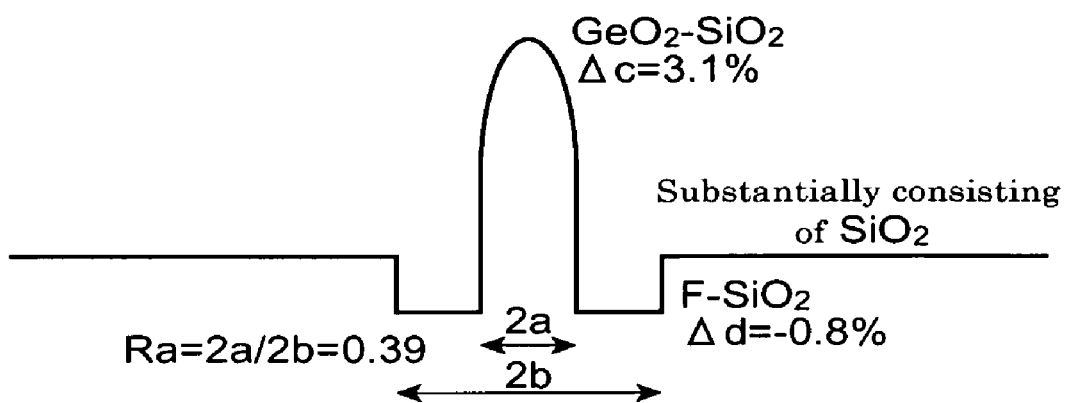
FIG. 11 A schematic diagram showing a refractive index profile of an optical fiber according to an embodiment C of the present invention.
Figure 12:
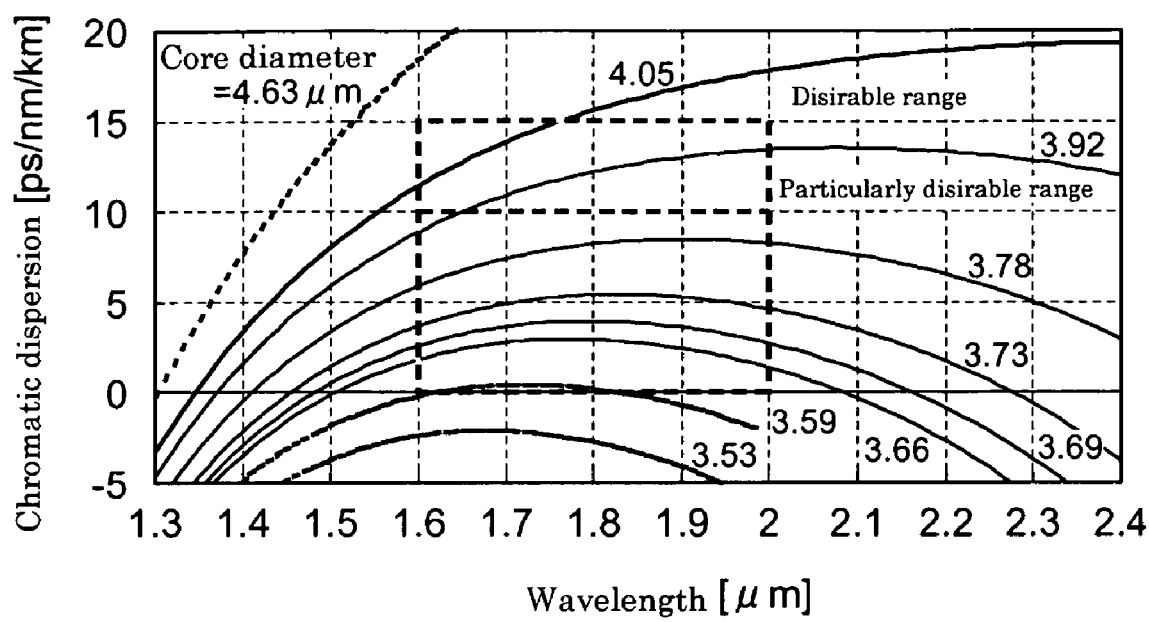
FIG. 12 A graph showing the dispersion characteristic of the optical fiber of the embodiment C.

FIG. 11 is a schematic diagram showing a refractive index profile of an embodiment (hereinafter, the "embodiment C") of the optical fiber according to the present invention. FIG. 12 is a graph showing the dispersion characteristic of the optical fiber of the embodiment C. In FIG. 12, the dispersion characteristics are shown with respect to the respective core diameter values. The range of preferable core diameter changes depending on parameter a and the relative refractive index difference of a central core region, the relative refractive index difference of the depressed region, and the core diameter ratio Ra, etc. Qualitatively speaking, as compared with the optical fiber of the embodiment C, the range of the preferable core diameter decreases in a case where the relative refractive index difference of the central core region is higher, parameter a is larger, or the relative refractive index difference of the depressed region is lower. The characteristics may change depending on the core diameter, but the effective area is in the range of 8.8 $\mu m^2$ to 11.3 $\mu m^2$, and the cutoff wavelength is in the range of 1240 nm to 1620 nm for each fiber.

Figure 13:
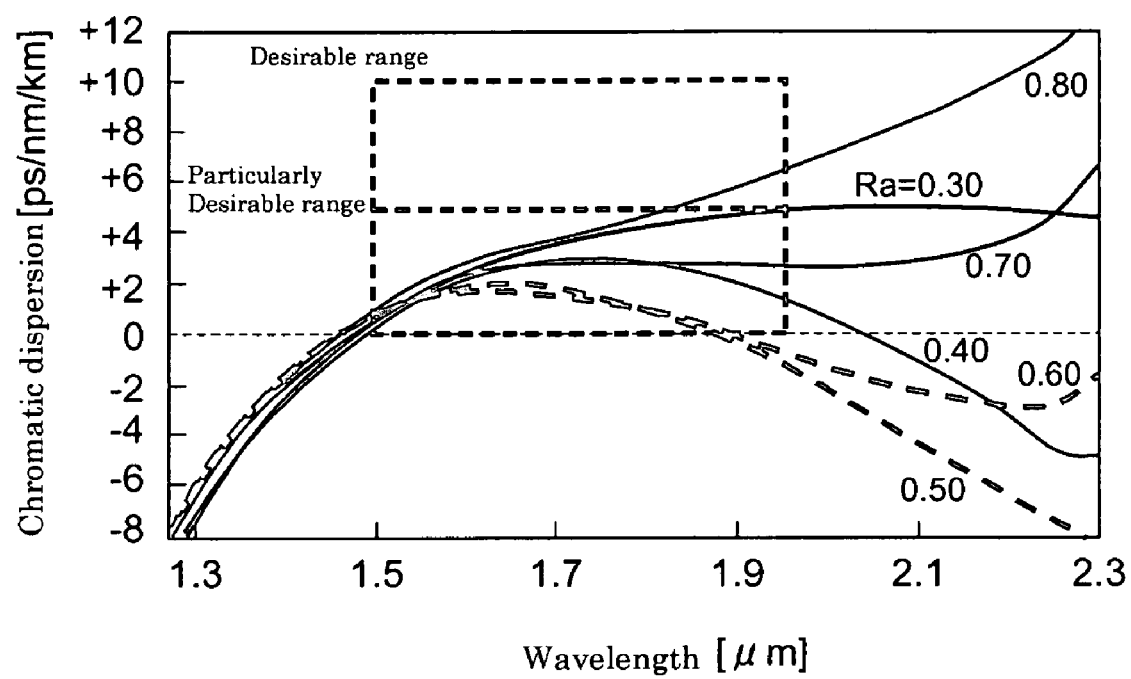
FIG. 13 A graph showing the dispersion characteristic of the optical fiber of the embodiment C, using a core diameter ratio Ra as a parameter.

FIG. 13 is a graph showing the dispersion characteristic of optical fibers of the embodiment C using the core diameter ratio Ra as a parameter. The core diameter ratio Ra is altered under the condition that the zero dispersion wavelength is in the neighborhood of 1500 nm. As shown in FIG. 13, the behavior of the dispersion characteristics is complicated, and the core diameter ratio Ra is preferably in the range of 0.30 to 0.80, and particularly preferable ranges are in the vicinity of 0.30 and 0.70. The range of preferable core diameter changes depending on the relative refractive index difference of the core region, parameter α, the relative refractive index difference of the depressed region, and the core diameter 2a.

Figure 14:
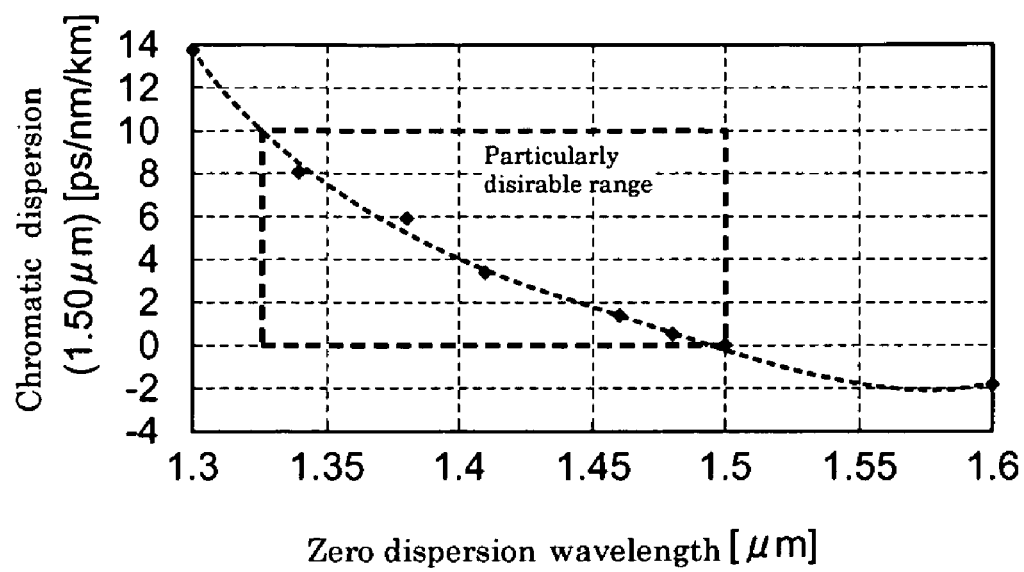
FIG. 14 A graph showing the relationship between the zero dispersion wavelength and the chromatic dispersion of the optical fiber of the embodiment C at a wavelength of 1500 nm.

FIG. 14 is a graph showing the relationship between the zero dispersion wavelength and the chromatic dispersion of the optical fiber of the embodiment C at the wavelength of 1500 nm. As shown in FIG. 14, it is more preferable that the zero dispersion wavelength be in the range of 1320 nm to 1500 nm.

Also, the polarization mode dispersion (PMD) of the optical fiber according to the present invention may be equal to or less than 1 $ps/km^{1/2}$, preferably 0.5 $ps/km^{1/2}$ or less, and more preferably 0.1 $ps/km^{1/2}$ or less. If the polarization mode dispersion (PMD) is small, then the long-time stability the spectrum of SC light improves.

Also, the optical fiber of the present invention may be a polarization maintaining fiber having a cross talk of −20 dB or less per 1 m fiber length between mutually orthogonal polarizations in the fundamental mode. In the polarization maintaining fiber, the polarization coupling will substantially not occur and the long-time stability improves.

Also, the optical fiber of the present invention may have an absorption loss of 5 dB/km or less due to an OH group at the wavelength of 1380 nm. In such case, the dip of output spectrum, which may be caused by the absorption of the OH group, can be evaded, and at the same time, the disappearance of a converted signal in the wavelength change can also be evaded. The absorption loss due to the OH group at the wavelength of 1380 nm is preferably 1 dB/km or less.

Figure 15:
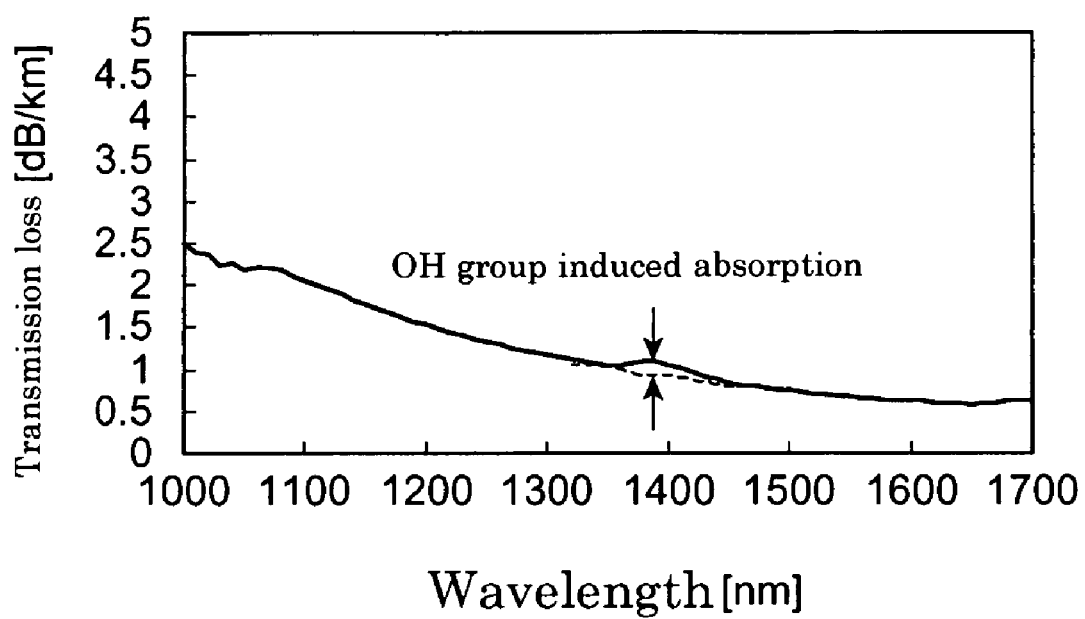
FIG. 15 A graph showing the transmission loss characteristic of an optical fiber according to an embodiment of the present invention.

FIG. 15 is a graph showing transmission loss characteristic in an embodiment of optical fiber according to the present invention. The transmission properties of this optical fiber are as follows: the zero dispersion wavelength is 1495 nm; the effective area (1550 nm) is 11.8 $\mu m^2$; the chromatic dispersion (1550 nm) is +1.4 ps/nm/km; the dispersion slope (1550 nm) is +0.025 $ps/nm^2$/km; the mode field diameter (1550 nm) is 3.6 μm; the nonlinear coefficient γ (1550 nm) is 19/W/km; and the polarization mode dispersion PMD (1550 nm) is 0.05 $ps/km^{1/2}$. The transmission loss is 0.67 dB/km at a wavelength of 1.55 μm, and the absorption loss due to the OH group is about +0.15 dB/km in the vicinity of the wavelength of 1.38 μm and is about +0.10 dB/km in the vicinity of the wavelength of 1.41 μm.

Figure 16:
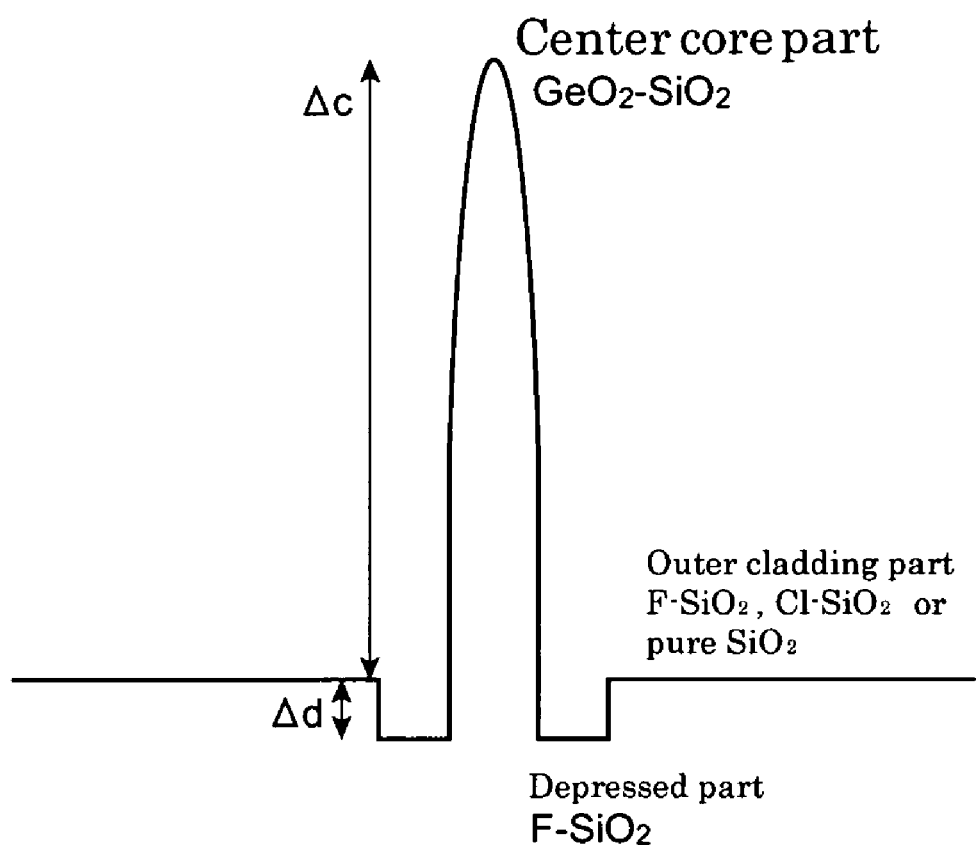
FIG. 16 A schematic diagram showing a refractive index profile of an optical fiber according to an embodiment D of the present invention.

FIG. 16 is a schematic diagram showing a refractive index profile of an optical fiber according to the embodiment D of the present invention. The optical fiber of the embodiment D, which is basically made of silica glass, has a central core region, a depressed region, which surrounds the center core region and has a refractive index lower than that of the central core region, and an outer cladding region, which surrounds the depressed region and has a refractive index higher than that of the depressed region. The relative refractive index difference of the central core region with respect to the outside cladding is represented by Δc, and the relative refractive index difference of the depressed region with respect to the outside cladding is represented by Δd.

An investigation was done with respect to optical fibers of the embodiment D in order to find how the characteristics of the optical fibers changes when the relative refractive index difference Δd is changed while the difference (Δc−Δd) between Δc and Δd is fixed at 3.5% which can comparatively easily be achieved. Here, the ratio Ra (=2a/2b), which is a ratio between the diameter 2a of the central core region and the diameter 2b of the depressed region was set to 0.35. Also, the parameter α of the central core region was set to 3.5.

Figure 17:
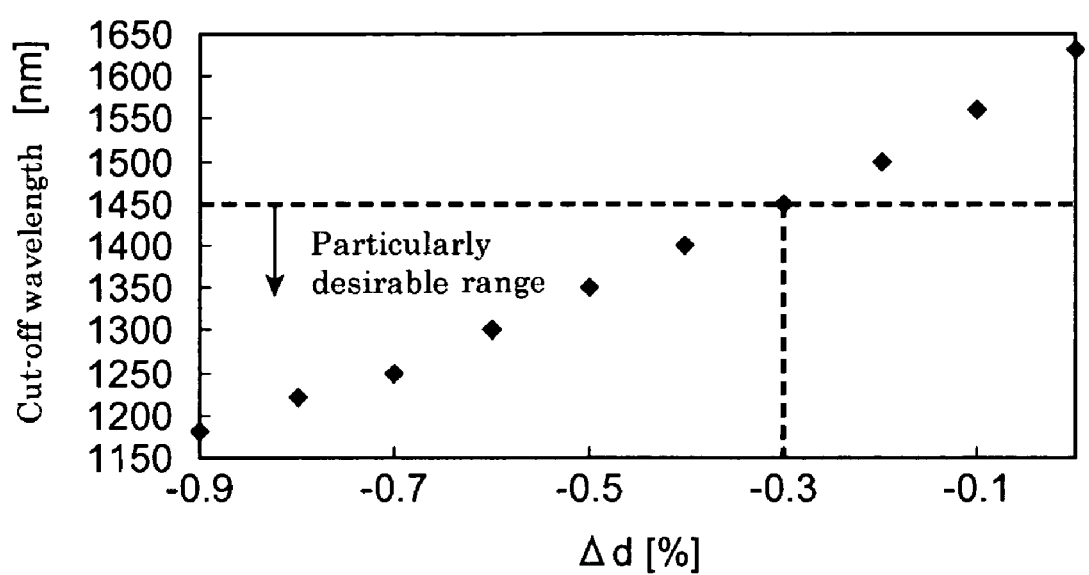
FIG. 17 A graph showing the relationship between the cutoff wavelength and a relative refractive index difference Δd in the depressed region of the optical fiber of the embodiment D.

As a result, there were no great differences in the following properties: in the case where the zero dispersion wavelength was 1493 to 1495 nm and the relative refractive index difference Δd of the depressed region was in the range of 0 (matched type) to −0.9% of, the effective area at the wavelength of 1550 nm was about 10.0 $\mu m^2$, nonlinear coefficient γ was about 22/W/km, the dispersion value was +1.6 to +1.8 ps/nm/km, and the dispersion slope was +0.026 to +0.028 $ps/nm^2$/km. On the other hand, the depressed-type helped to make the cutoff wavelength into a short wavelength. FIG. 17 is a graph showing the relationship between the cutoff wavelength of the optical fiber of embodiment D and the relative refractive index difference Δd of the depressed region. When the relative refractive index difference Δd of the depressed region is equal to or less than −0.3%, the cutoff wavelength becomes 1450 nm or less. Thus, it is desirable that the relative refractive index difference Δd of the depressed region be −0.3% or less.

The relative refractive index difference Δd of the depressed region can comparatively easily be decreased to the extent of about −0.8% by adopting $SiO_2$ glass containing Fluorine as a dopant. Thus, an investigation was done in order to find how the characteristics of the optical fiber change when the relative refractive index difference Δc of the central core region is altered while the relative refractive index difference Δd of the depressed region is fixed at −0.8%.

The characteristics of the optical fibers which were investigated as concrete examples are shown in Table IV.

TABLE IV

|  | Δc (%) | Transmission loss (dB/km) | Zero-dispersion wavelength (nm) | Dispersion (ps/km/nm) | Dispersion slope (ps/km/nm$^2$) | Cutoff wavelength (nm) | Aeff (μm$^2$) | MFD (μm) | γ/W/km | PMD ps/√km |
|---|---|---|---|---|---|---|---|---|---|---|
| Fiber 12 | 1.5 | 0.25 | 1499 | 1.3 | 0.023 | 920 | 14.5 | 4.3 | 12 | 0.04 |
| Fiber 13 | 2.0 | 0.40 | 1497 | 1.7 | 0.028 | 1060 | 12.2 | 4.0 | 15 | 0.12 |
| Fiber 14 | 2.5 | 0.50 | 1500 | 1.6 | 0.029 | 1180 | 10.9 | 3.7 | 20 | 0.05 |
| Fiber 15 | 3.0 | 0.70 | 1494 | 1.9 | 0.031 | 1270 | 9.7 | 3.5 | 24 | 0.05 |
| Fiber 16 | 3.5 | 0.90 | 1493 | 2.1 | 0.031 | 1370 | 8.9 | 3.3 | 29 | 0.04 |
| Fiber 17 | 4.0 | 1.4 | 1495 | 2.2 | 0.033 | 1470 | 8.0 | 3.2 | 34 | 0.09 |
| Fiber 18 | 4.5 | 1.8 | 1492 | 2.3 | 0.035 | 1540 | 7.5 | 3.0 | 40 | 0.22 |
| Fiber 19 | 5.0 | 2.9 | 1498 | 2.2 | 0.037 | 1620 | 6.9 | 2.9 | 47 | 0.25 |
| Fiber 20 | 5.5 | 4.2 | 1500 | 2.1 | 0.039 | 1680 | 6.3 | 2.8 | 54 | 0.42 |

Figure 18:
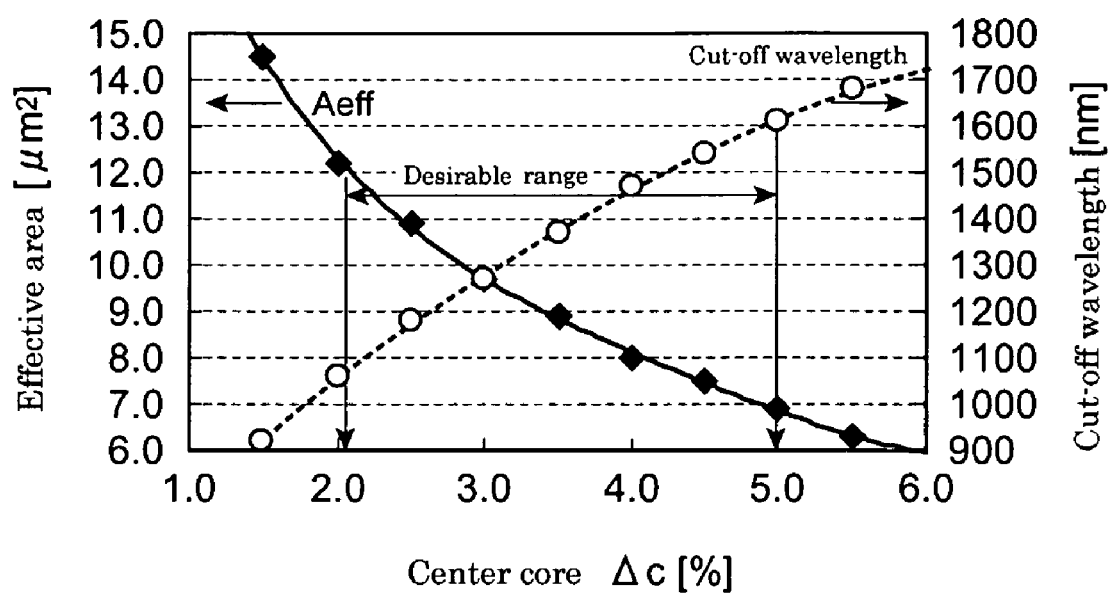
FIG. 18 A graph showing the relationships between the effective area, the cutoff wavelength, and the relative refractive index difference Δc of the core region in examples of the optical fiber of the embodiment D.

FIG. 18 is a graph showing the relationships between the effective area, the cutoff wavelength, and the relative refractive index difference Δc of the core region in examples of the optical fiber of the embodiment D. Here, the ratio Ra (=2a/2b) between the diameter 2a of the central core region and the diameter 2b of the depressed region was 0.35. Also, parameter α of the central core region was 3. As shown in FIG. 18, if the relative refractive index difference Δc of the core region is equal to or more than 2.0%, the effective area can be made equal to or less than 12 μm$^2$. Also, if the relative refractive index difference Δc of the core region is 5.5% or less, the cutoff wavelength can be made equal to or less than 1650 nm or less. Therefore, the relative refractive index difference of the core region with respect to the outer cladding region is preferably from 2.0% or more and 5.5% or less.

In the spectrum of the SC light output from the optical fiber of the present invention, the difference between the peak light intensity and the light intensity at a wavelength of 1000 nm may be equal to or less than 10 dB. Likewise, the difference between the peak light intensity and the light intensity at a wavelength of 2200 nm may be equal to or less than 10 dB.

Figure 19:
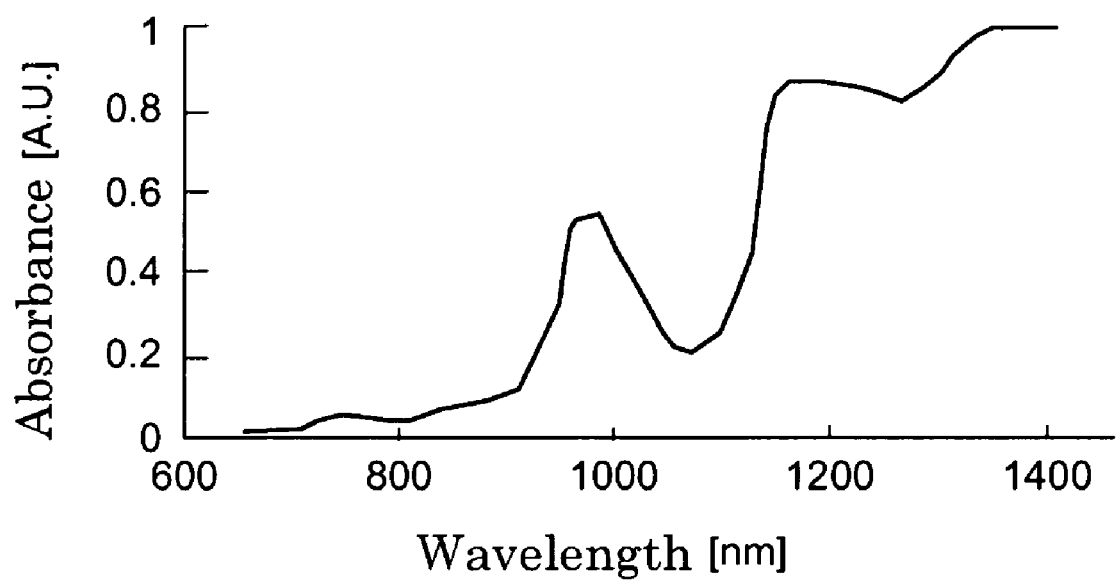
FIG. 19 A graph showing the spectrum of water absorption.

In the near infrared spectroscopy, each compound has its characteristic absorption spectrum in a wavelength range of 1.2 μm to 1.8 μm, the absorption spectra of compounds are actively measured in this region. For example, the absorption spectrum of water is as shown in FIG. 19. On the other hand, light having a wavelength within a range of 0.8 μm to 1.1 μm has high transmittance because the absorbance of water or OH groups is small in this range, which is a region that may be called "a window of an organism". The wavelength of 1000 to 1100 nm, which is such a window region, can be used if a wavelength range obtained with SC light is expanded to an extent of 1000 nm or less, and thereby a deep reaching depth for a living body can be achieved. Even in this wavelength range, the absorption of a compound occurs, and it is possible to obtain the absorption spectrum at a deep (e.g. 10 mm or more) position of a living body, which is otherwise generally considered to be difficult. Likewise, it is possible to obtain a sectional image of a deep position from reflection and diffusion information in which a wavelength band of 1000 nm or less is used. By expanding the wavelength range preferably to the extent of 900 nm or less, it is made possible to use a window region having a still shorter wavelength.

In the optical measurement field, an iodine-stabilized Nd: YAG laser beam source having a wavelength of 1064 nm is used. As described in a document, it is an important subject to exactly measure the absolute frequency of such laser beam source. At a wavelength in the vicinity of the spectral end of the SC light, the intensity of output light tends to become unstable due to polarization dispersion in an optical fiber, the temperature dependence of chromatic dispersion, the output fluctuation of a seed light source, etc. In order to measure the absolute wavelength of the iodine-stabilized 1064 nm laser light source, it would be preferable that the SC light spectrum be expanded to the extent of 1064 nm or less. However, with the conventional technique, it has been difficult to expand to such an extent of wavelength in order to obtain a SC light spectrum having stable output. If the SC light spectrum is made to have a sufficiently short wavelength of 1000 nm or less according to the present invention, the output power in the vicinity of the 1064 nm wavelength can be stabilized, and thereby it is made possible to conduct a highly reliable measurement of the absolute frequency over long hours.

Also, in the ranges of 0.8 μm to 1.1 μm, 1.6 μm to 1.8 μm, and 2.0 μm to 2.5 μm, the absorption of water and carbon dioxides little occurs, and these regions may be called "windows of the air". Therefore, if a light source having some degree of coherency covering such a range can easily be achieved, it is useful because it would enable the light to reach a sufficiently long distance, which will enable application to a laser lidar in the atmospheric air, for example.

Preferably, the time-averaged output power of SC light output from the optical fiber is 10 mW or more. Such power will secure the power necessary for the spectrum measurement, the living body observation, and the like. In the spectrum of the SC light output from the optical fiber, preferably the spectral power at any of wavelengths of 1000 nm or less is −20 dBm/nm or more. In such case, it is possible to secure a dynamic range of 30 dB or more by comparing with the sensitivity of a detector, and it will be useful for spectral measurement and a measurement of transmittance/reflection characteristics of optical communication devices in a wavelength band of 1000 nm or less.

The present patent application is based on Japanese patent application (Application No. 2006-71137) filed on Mar. 15, 2006, and the contents thereof are incorporated herein by reference.

INDUSTRIAL APPLICABILITY

The broadband light source of the present invention can be applied to optical measurement and near infrared spectroscopy.

The invention claimed is:

1. An optical fiber having a zero dispersion wavelength in the wavelength range of 1300 nm to 1500 nm, the optical fiber having an effective area of 12 μm$^2$ or less and a chromatic dispersion of 0 or more and 10 ps/nm/km or less at a wavelength of 1550 nm, and the chromatic dispersion being 0 ps/nm/km or more in a wavelength range of 1500 nm to 2000 nm.

2. An optical fiber according to claim 1, wherein the cutoff wavelength is 1650 nm or less and the absolute value of the dispersion slope is 0.04 ps/nm$^2$/km or less at a wavelength of 1550 nm.

3. An optical fiber according to claim 1, wherein the chromatic dispersion is 0 ps/nm/km or more and 15 ps/nm/km or less in the wavelength range of 1500 nm to 2000 nm.

4. An optical fiber according to claim 1, wherein the polarization mode dispersion is equal to or less than 1 ps/km$^{1/2}$.

5. An optical fiber according to claim 1, wherein the cross talk between mutually orthogonal polarizations in the fundamental mode is −20 dB or less per 1 m fiber length.

6. An optical fiber according to claim 1, wherein the absorption loss due to an OH group at the wavelength of 1380 nm is 5 dB/km or less.

7. An optical fiber according to claim 1, wherein the optical fiber is basically made of silica glass and comprises a central core region, a depressed region surrounding the center core region and having a refractive index lower than that of the central core region, and an outer cladding region surrounding the depressed region and having a refractive index higher than that of the depressed region, and wherein the relative refractive index difference of the depressed region with respect to the outer cladding region is equal to or less than −0.3%.

8. An optical fiber according to claim 1, wherein the optical fiber can output supercontinuum light having a wavelength bandwidth expanded to 1000 nm or more by input of light having a central wavelength within a wavelength range of 1500 nm to 1650 nm, and wherein the optical fiber has a zero dispersion wavelength in the wavelength range of 1300 nm to 1500 nm, and at the central wavelength the effective area being equal to or less than 12 μm$^2$ and the chromatic dispersion being 0 or more and 10 ps/nm/km or less.

9. An optical fiber according to claim 8, wherein the chromatic dispersion is 0 ps/nm/km or more in the wavelength range of 1500 nm to 2000 nm.

10. A broadband light source equipped with a seed light source and an optical fiber, wherein the seed light source can output light having a central wavelength in the wavelength range of 1500 nm to 1650 nm, and wherein the optical fiber has a zero dispersion wavelength in the wavelength range of 1300 nm to 1500 nm and an effective area of 12 μm$^2$ or less at the central wavelength, and as a result of input of the light output from the seed light source, the optical fiber can output supercontinuum light having a wavelength bandwidth expanded to 1000 nm or more.

11. A broadband light source according to claim 8, wherein in the spectrum of the supercontinuum light output from the optical fiber, the difference between the peak light intensity and the light intensity at a wavelength of 1000 nm may be equal to or less than 10 dB.

12. A broadband light source according to claim 10, wherein the difference between the peak light intensity and the light intensity at a wavelength of 2200 nm may be equal to or less than 10 dB.

13. A broadband light source according to claim 10, wherein the time-averaged output power of supercontinuum light output from the optical fiber is 10 mW or more.

14. A broadband light source according to claim 10, wherein in the spectrum of the supercontinuum light output from the optical fiber, the spectral power at any of wavelengths of 1000 nm or less is −20 dBm/nm or more.

15. A broadband light source according to claim 10, wherein the seed light source is a pulsed light source.

16. A broadband light source according to claim 15, wherein the seed light source is an Er-doped fiber laser light source.

17. A broadband light source according to claim 15, wherein the seed light source is a pulsed light source having an amplification medium incorporating an Er-doped glass and a semiconductor saturable absorber mirror in the cavity.

* * * * *